United States Patent
Alush et al.

(10) Patent No.: US 12,063,108 B2
(45) Date of Patent: Aug. 13, 2024

(54) SYSTEM AND METHOD FOR SIGNAL RE-TRANSMISSION

(71) Applicant: ELBIT SYSTEMS EW AND SIGINT-ELISRA LTD, Holon (IL)

(72) Inventors: Henry Victor Alush, Holon (IL); Eran Kanter, Holon (IL); Menachem Avishay Antman, Holon (IL)

(73) Assignee: ELBIT SYSTEMS EW AND SIGINT-ELISRA LTD, Holon (IL)

( * ) Notice: Subject to any disclaimer, the term of this patent is extended or adjusted under 35 U.S.C. 154(b) by 337 days.

(21) Appl. No.: 17/763,058

(22) PCT Filed: Sep. 24, 2020

(86) PCT No.: PCT/IL2020/051042
§ 371 (c)(1),
(2) Date: Mar. 23, 2022

(87) PCT Pub. No.: WO2021/059274
PCT Pub. Date: Apr. 1, 2021

(65) Prior Publication Data
US 2022/0393786 A1 Dec. 8, 2022

Related U.S. Application Data (60) Provisional application No. 63/081,945, filed on Sep. 23, 2020, provisional application No. 63/080,840, filed on Sep. 21, 2020.

(30) Foreign Application Priority Data

Sep. 24, 2019 (IL) .......................................... 269678

(51) Int. Cl.
*H04K 3/00* (2006.01)

(52) U.S. Cl.
CPC ................. *H04K 3/46* (2013.01); *H04K 3/42* (2013.01)

(58) Field of Classification Search
CPC .................................. H04K 3/46; H04K 3/42
See application file for complete search history.

(56) References Cited

U.S. PATENT DOCUMENTS

| | | | |
|---|---|---|---|
| 4,928,104 A | 5/1990 | Schaffer | |
| 4,956,871 A * | 9/1990 | Swaminathan | ........ H04B 1/667 704/229 |

(Continued)

FOREIGN PATENT DOCUMENTS

| | | | |
|---|---|---|---|
| CN | 105572643 A | 5/2016 | |
| CN | 106226745 A | 12/2016 | |

(Continued)

OTHER PUBLICATIONS

Byun, 2016, Vector Radix 2 × 2 Sliding Fast Fourier Transform, Mathematical Problems in Engineering, vol. 2016, Article IS 2416286, 8 pages.

(Continued)

*Primary Examiner* — Junpeng Chen
(74) *Attorney, Agent, or Firm* — Brown Rudnick LLP; Matthew P. York (57) ABSTRACT

System and for signal re-transmission including a channelizer, a signal-effect-processor and a controller. The signal-effect-processor includes a plurality of sub-band-processors and a summer. The channelizer receives a sampled Intermediate-Frequency signal exhibiting a first sampling-rate. The channelizer produces a plurality of sub-band-signals, each associated with a respective sub-band of the Intermediate-Frequency signal. Each sub-band-signal exhibit a second sampling-rate lower than the first sampling-rate. Each of at least one selected sub-band-processor receives a respective sub-band-signal, introduces at least one effect to the respective sub-band-signal, and increases the sampling-rate of the (Continued)

respective sub-band-signal to the first sampling-rate, thereby producing a respective affected sub-band re-transmit signal. Each selected sub-band-processor is further provides the respective affected sub-band re-transmit signal to a respective input of the summer. The summer sums the inputs thereof to produce a wideband affected re-transmit signal. The controller selects the selected sub-band processor and controls settings of the at least one effect.

11 Claims, 4 Drawing Sheets

(56) References Cited

U.S. PATENT DOCUMENTS

| | | | |
|---|---|---|---|
| 5,537,435 A * | 7/1996 | Carney | H04B 1/0014 |
| | | | 375/219 |
| 6,473,474 B1 | 10/2002 | Wiegand | |
| 8,699,615 B2 | 4/2014 | Couillard et al. | |
| 8,773,296 B1 * | 7/2014 | Dusatko | H03M 3/50 |
| | | | 341/143 |
| 8,803,730 B2 | 8/2014 | Jiang | |
| 8,805,297 B2 | 8/2014 | Hanevich et al. | |
| 9,134,412 B2 | 9/2015 | Fireaizen | |
| 9,479,214 B2 | 10/2016 | Webb et al. | |
| 2001/0000216 A1 | 4/2001 | Kober et al. | |
| 2002/0034191 A1 * | 3/2002 | Shattil | H04L 27/2601 |
| | | | 370/464 |
| 2002/0154687 A1 * | 10/2002 | Bierly | H01Q 3/30 |
| | | | 375/222 |
| 2010/0135368 A1 | 6/2010 | Mehta et al. | |
| 2013/0021197 A1 | 1/2013 | Jiang | |
| 2013/0315341 A1 | 11/2013 | Couillard et al. | |
| 2015/0155899 A1 | 6/2015 | Webb et al. | |
| 2017/0012598 A1 | 1/2017 | Harris et al. | |
| 2017/0045608 A1 | 2/2017 | Mclean et al. | |
| 2017/0214558 A1 | 7/2017 | Nazarathy et al. | |

FOREIGN PATENT DOCUMENTS

| | | |
|---|---|---|
| JP | 2019020368 A | 2/2019 |
| KR | 20110068701 A | 6/2011 |

OTHER PUBLICATIONS

Chaudhari, 2016, Understanding sample rate conversion and scaling factors, [Retreived on Jun. 23, 2022] Retrevied on the internet at: <https://www.edn.com/understanding-sample-rate-conversion-and-scaling-factors>.
Exam Report issued in Singapore Application No. 11202106729Q, date of mailing: Mar. 28, 2022, 6 pages.
International Search Report issued in International Application No. PCT/IL2020/051042, date of mailing: Jan. 12, 2021, 3 pages.
Search Report issued in Israeli Application No. 269678, date of mailing: Jun. 9, 2020, 1 page.
Zahirniak, 1998, A Hardware-Efficient Multirate, Digital Channelized Receiver Architecture, IEEE transactions on aerospace and electronic systems, 34(1).
Zhivomirov, 2019, On the Development of STFT-analysis and ISTFT-synthesis Routines and their Practical Implementation, TEM Journal, 8(1):56-64.
Zongbo, 2008, Design and application of DRFM system based on digital channelized receiver, 2008 International Conference on Radar, Adelaide, SA, pp. 375-378.
Extended European Search Report (with Annex) issued in European Application No. 20869625.2, date of mailing: Dec. 15, 2022, 7 pages.
Japanese Office Action and its translation issued in Japanese Application No. 2022-543815, dated Nov. 1, 2023, 10 pages.

* cited by examiner

SYSTEM AND METHOD FOR SIGNAL RE-TRANSMISSION

FIELD OF THE DISCLOSED TECHNIQUE

The disclosed technique relates to transceivers in general, and to methods and system for introducing effects to a signal to be re-transmitted, in particular.

BACKGROUND OF THE DISCLOSED TECHNIQUE

Re-transmitting signals with jamming effects, employing Digital Radio Frequency Memory (DRFM), is known in the art. Typically, the DRFM records a received signal, a jamming processor introduces jamming effects (e.g., delay, amplitude modulation, phase modulation, Doppler Effect), and the modified signal is re-transmitted toward the source thereof. When the signal is a radar signal, the radar receiving the modified signal shall produce an erroneous indication regarding the position and the Doppler frequency of the object (e.g., aircraft) which employs the DRFM. One of the drawbacks of DRFM systems is that such systems operate on bandwidth, which is wider than the bandwidth of the signal or signals of interest. In other words, known in the art DRFM systems operate on bands which do not necessarily include signals of interest.

The publication entitled "Design and Application of DRFM System Based on Digital Channelized Receiver" to Wang Zongbo et al, directs to a DRFM system, employed for jamming signal modulation. In the system directed to by Wang Zongbo et al, a digital channelized receiver is added between the Analog to Digital Converter (ADC) and the memory. The ADC sampling frequency corresponds to the instantaneous bandwidth of the received signal. The channelized receiver partitions instantaneous bandwidth of the received signal into D uniform sub-channels where each sub-channel covers an equal portion of the bandwidth. The channelized receiver also provides a channel number which is employed to set the transmit frequency. Since the received signal is channelized into D channels, the data flow speed is 1/D of the sampling frequency. A Digital to Analog Converter respective of each sub-channel, with a conversion speed of $f_s/D$, where $f_s$ is the sampling frequency, converts the jamming modulated signal into an analog signal. The converted signal is up converted according to the respective transmit frequency determined by the sub-channel thereof.

U.S. Pat. No. 6,473,474 to Wiegand entitled "Wide Band Alias resolving digitally Channelized receiver and a Memory for Use Therewith" directs to channelized broadband receiver which partitions the broad frequency bands to channels such that signals in each channel are independently sensed or modulated. The publication to Wiegand is directed at addressing the problem of different operating clock rates between the Digital Signal Processor (DSP) performing the channelization and filtering, and the Converters (i.e., Analog to Digital and Digital to Analog). To that end, the publication to Wiegand suggests a DSP which employs demultiplexer to separate the signals into a plurality of channels, filters which filtering and phase shift the separated signal and a summer which adds the filter signals.

SUMMARY OF THE PRESENT DISCLOSED TECHNIQUE

It is an object of the disclosed technique to provide a novel method and system for signal re-transmission. In accordance with an aspect of the disclosed technique, there is thus provided a system and for signal re-transmission. The system includes a channelizer, a signal effect processor and a controller. The signal effect processor is coupled with the channelizer. The controller is coupled with coupled with the channelizer and with the signal effect processor. The signal effect processor includes a plurality of sub-band processors and a summer. The channelizer is configured to receive a sampled Intermediate Frequency signal. The sampled Intermediate Frequency signal exhibits a first sampling rate. The channelizer is further configured to produce a plurality of sub-band signals. Each sub-band signal is associated with a respective sub-band of the sampled Intermediate Frequency signal. Each sub-band signal exhibit a second sampling rate lower than the first sampling rate. Each of at least one selected sub-band processor is configured to receive a respective sub-band signal, to introduce at least one effect to the respective sub-band signal, and to increase the sampling rate of the respective sub-band signal to the first sampling rate, thereby producing a respective affected sub-band re-transmit signal. Each of the at least one selected sub-band processor is further configured to provide the respective affected sub-band re-transmit signal to a respective input of the summer. The summer is configured to sum the inputs thereof to produce a wideband affected re-transmit signal. The controller is configured to select the at least one selected sub-band processor and to control settings of the at least one effect.

In accordance with another aspect of the disclosed technique, there is thus provided a method for signal re-transmission. The method includes the procedure of determining a plurality of sub-band signals, each sub-band signal being associated with a respective sub-band of the sampled received Intermediate Frequency signal. The sampled received Intermediate Frequency signal exhibits a first sampling rate. Each sub-band signal exhibiting a second sampling rate lower than the first sampling rate. The method also includes the procedure of introducing, for each of at least one sub-band of interest, at least one selected effect to the respective sub-band signal, thereby producing an affected sub-band signal for each of the at least one sub-band of interest. The method further includes the procedures of increasing the sampling rate of each affected sub-band signal to the first sampling rate to produce at least one effected sub-band re-transmit signal, and summing all affected sub-signals re-transmit to produce a wideband affected re-transmit signal.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

The disclosed technique overcomes the disadvantages of the prior art by providing a system and a method for signal re-transmission, which exploits the sparseness of the received bandwidth. In other words, since the received bandwidth is sparse, it is not necessary to process the entire received bandwidth, but rather only selected sub-bands in which a signal exists. According to the disclosed technique, a wideband received IF signal is sampled. However, only selected sub-bands of the wideband received IF signal, which exhibit a narrow bandwidth (i.e., narrow relative to the bandwidth of the received wideband IF signal), are processed. Consequently, the processing requirements (e.g., processing time, power consumption) are lower relative to the processing requirements when the entire bandwidth of the wideband IF signal is processed.

Figure 1A:
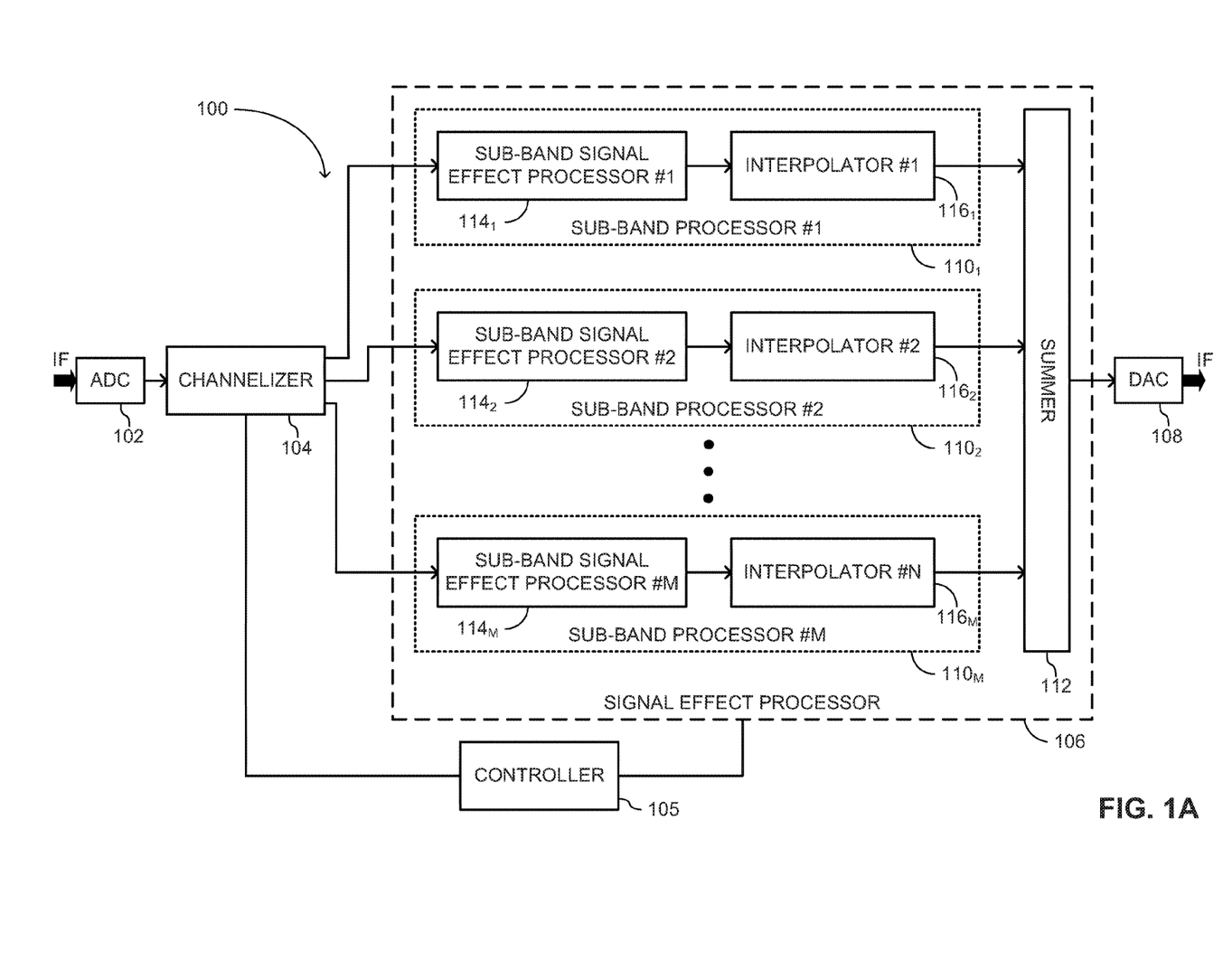
FIGS. 1A, 1B and 1C are schematic illustrations of a system for signal re-transmission, constructed and operative in accordance with an embodiment of the disclosed technique.
Figure 1B:
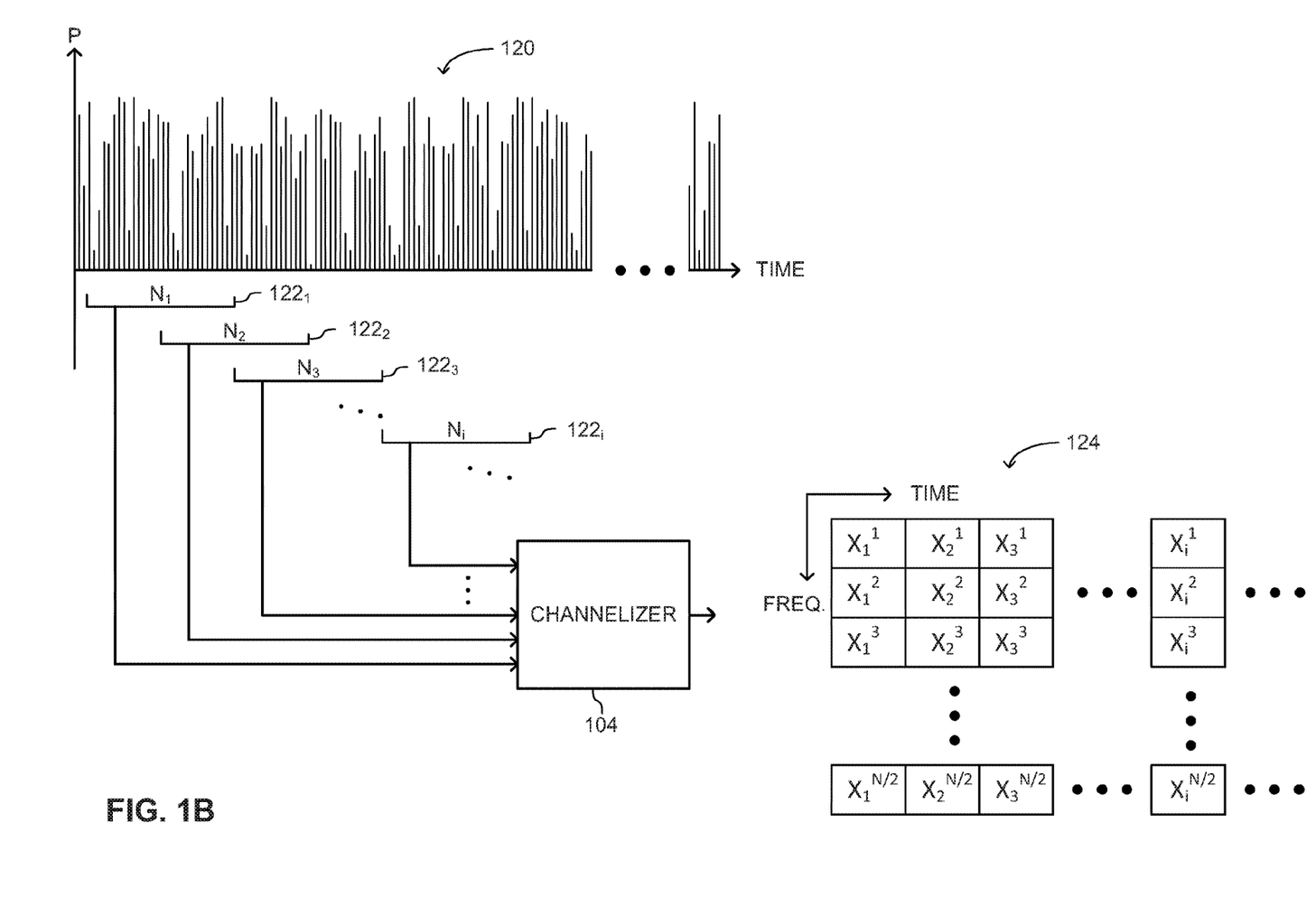
Figure 1C:
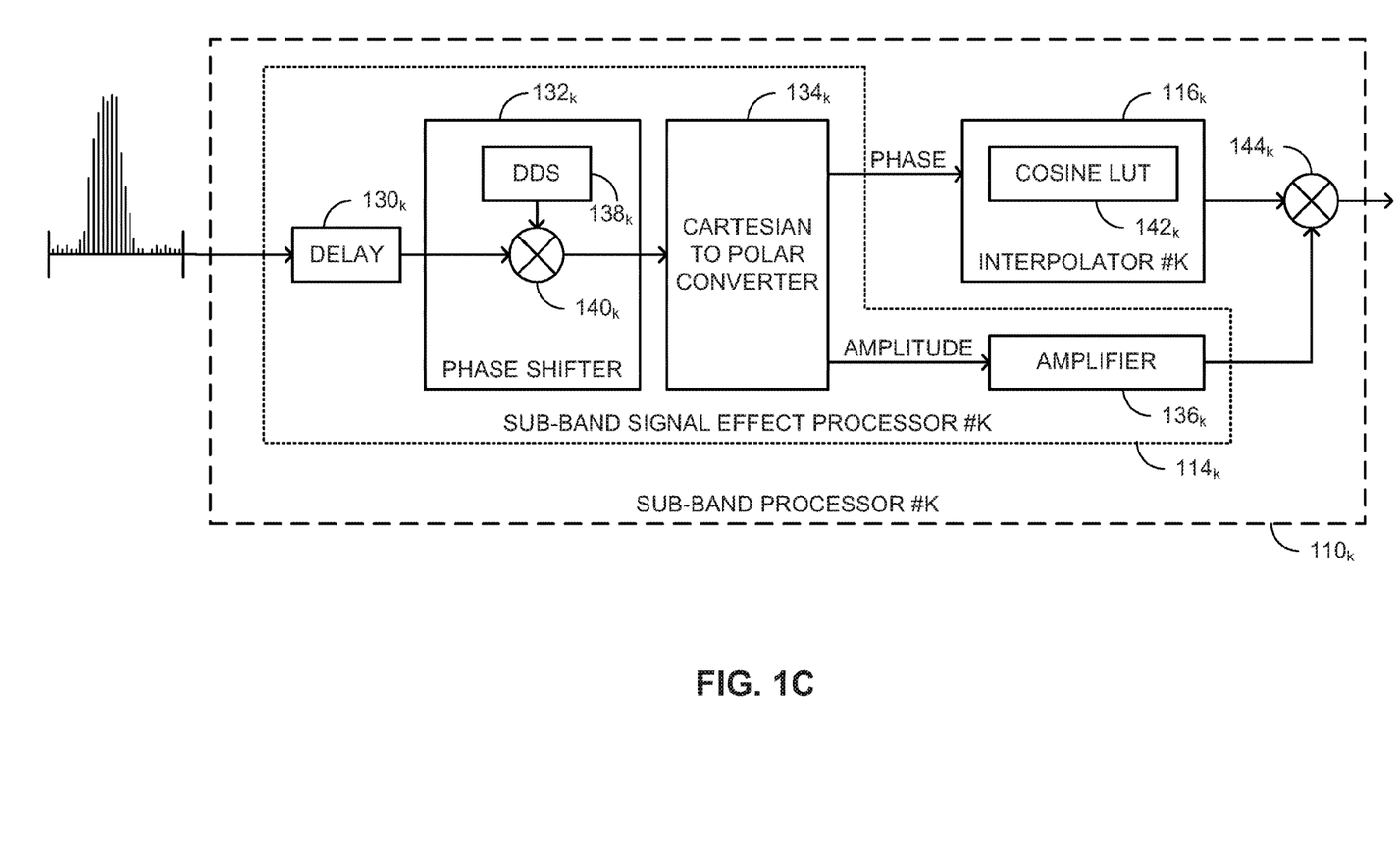

Reference is now made to FIGS. 1A, 1B and 1C, which are schematic illustrations of a system, generally referenced 100, for signal re-transmission, constructed and operative in accordance with an embodiment of the disclosed technique. In general, system 100 receives a wideband IF signal (e.g., a RADAR signal or a communications signal), introduces various jamming effects (e.g., delay, amplitude modulation, frequency modulation) and re-transmits the affected signal.

System 100 includes an Analog to Digital Converter (ADC) 102, a channelizer 104, a controller 105, a signal effect processor 106 and a Digital to Analog Converter (DAC) 108. Signal effect processor 106 includes a plurality of sub-band signal effect processors $110_1, 110_2, \ldots, 110_M$ and a summer 112. Each one of sub-band processor $110_1$, $110_2, \ldots, 110_M$ includes a respective sub-band signal effect processor $114_1, 114_2, \ldots, 114_M$ and a respective interpolator $116_1, 116_2, \ldots, 116_M$.

The input of each one of sub-band signal effect processors $114_1, 114_2, \ldots, 114_M$ is coupled with the output of channelizer 104 and the output of each one of sub-band signal effect processors $114_1, 114_2, \ldots, 114_M$ is coupled with the input of a respective interpolator $116_1, 116_2, \ldots, 116_M$. The outputs of interpolators $116_1, 116_2, \ldots, 116_M$ are coupled with the inputs of summer 112. The input of channelizer 104 is coupled with the output of ADC 102. The output of summer 112 is coupled with the input of DAC 108. Controller 105 is coupled with channelizer 104 and with signal effect processor 106.

ADC 102 receives a wideband IF signal from an RF front end (not shown) and samples the received wideband IF signal at a respective sampling rate, as defined by the sampling theorem and additional system requirements and constraints (e.g., guard bands, system clock frequency, samplers availability and the like). ADC 102 produces a sampled wideband IF signal 122. ADC 102 provides the sampled wideband IF signal 120 to channelizer 104. With reference to FIG. 1B, channelizer 104 produces a spectrogram 124 of the wideband sampled IF signal 122. Spectrogram 124 may be continuous or finite. To produce spectrogram 124, channelizer 104 determines the frequency representation (e.g., by employing a Fast Fourier Transform—FFT algorithm) of each group of N samples, where consecutive sample groups $122_1, 122_2, 122_3, \ldots, 122_i, \ldots$ (i.e., each of N samples) include overlapping samples (i.e., the first v samples in sample group $122_i$ are the last v samples in sample group $122_{i-1}$, where v represents a number). In other words, v is the number of overlapping samples between two consecutive frames. The term N/v (i.e., N divided by v) is referred to herein as 'the overlap factor'. Thus, channelizer 104 produces a plurality of frequency representations vectors, where each such frequency representation vector includes N/2 frequency bins (i.e., N/2 due to conjugate symmetry of the Fourier Transform). Frequency bins are also referred to herein as sub-bands. Also, each frequency representation vector is associated with a respective time-tag. Each entry in a frequency representation vector is of the form $X_n^k$, where k represents the sub-band and n represents the time-tag (i.e., the superscript relates to the bin number and the subscript relates to the time). For example channelizer 104 produces frequency representation vector $X_1^1, X_1^2, X_1^3, \ldots, X_1^{N/2}$ respective of the first instance from sample group $122_1$. Channelizer 104 produces a frequency representation vector $X_2^1, X_2^2, X_2^3, \ldots, X_2^{N/2}$ respective of the second time instance from sample group $122_2$ and so on. It is noted that each entry in a frequency representation vector is a complex number (i.e., resulting from the time to frequency transformation). In other words, a spectrogram is a function, typically a discrete function, of time and frequency. Typically, a spectrogram is determined by employing Short Time FFT (SFFT), Generalized Slide FFT, Sliding Discrete Fourier Transform (SDFT), or with a bank of time filters with decimation.

Channelizer 104 provides selected sub-band signals to respective ones of sub-band processors $110_1, 110_2, \ldots, 110_M$ (i.e., to selected ones of sub-band processors $110_1, 110_2, \ldots, 110_M$). In general the number M of sub-band processors $110_1, 110_2, \ldots, 110_M$ is equal or smaller than N/2 (i.e., M≤N/2, where N/2 is the number of frequency bins). A sub-band signal is defined by a stream of the $k^{th}$ entries of consecutive frequency representation vectors. For example, entries $X_1^1, X_2^1, X_3^1, \ldots, X_i^1, \ldots$ in spectrogram 124 define a sub-band signal associated with the first sub-band (i.e., sub-band 1), entries $X_1^2, X_2^2, X_3^2, \ldots, X_i^2, \ldots$ in spectrogram 124 define a sub-band signal associated with the second sub-band (i.e., sub-band 2). Therefore, each sub-band signal is associated with a respective $k^{th}$ sub-band of the bandwidth of the IF signal. Also, since each entry in a frequency representation vector is a complex number, the values of the sub-band signals are also complex numbers. The sample rate of each sub-band signal is given by:

$$SBSR = IFSR \times \frac{\text{overlap factor}}{N} \quad (1)$$

where SBSR is the sample rate of the sub-band signal, IFSR is the sampling rate of wideband sampled IF signal 122 and overlap factor and N are as described above. The overlap factor in Equation (1) is employed since each entry in a frequency representation vector is determined from a group of N samples, where a portion of the samples are employed by two or more sub-band signals. As such the sample rate of each sub-band signal is lower than the sample rated of the sampled wideband IF signal.

Typically, only a fraction of the bandwidth of wideband IF signal 122 includes a signal or signals of interest. As such, only the sub-band signals corresponding to bandwidth of these signals of interest are provided to respective ones of sub-band signal effect processors $114_1, 114_2, \ldots, 114_M$. In other words, only selected portions (i.e., sub-bands of interest) of the bandwidth of the IF signal are processed. In the special case where M=N/2, each sub-band signal associated with a selected $k_{th}$ sub-band may be allocated to the corresponding $k_{th}$ sub-band signal effect processor. In general, the selection and allocation of sub-band signals to respective signal effect processors is controlled by controller 105. Controller 105 exploits the spectral sparseness of the received IF signal. For example, controller 105 may have prior information related to sub-bands of interest. Alternatively, or additionally, controller 105 may allocate only sub-band signals which the amplitude thereof is above a predetermined threshold.

In each one of the selected sub-band processors $110_1$, $110_2$, ..., $110_M$, the respective sub-band signal effect processor $114_1$, $114_2$, ..., $114_M$, introduces respective selected effects to the corresponding sub-band signal provided thereto, and produces a respective affected sub-band signal. These effects are, for example, one of delay, amplitude modulation, phase modulation, and Doppler Effect, or any combination thereof. With reference to FIG. 1C, depicted therein is an exemplary implementation of a sub-band signal processor $110_k$. Sub-band processor $110_k$ includes a sub-band signal effect processor $114_k$ coupled with an interpolator $116_k$ and with a mixer $144_k$. Sub-band signal effect processor $114_k$ includes a delay $130_k$ (e.g., a delay line), a phase shifter $132_k$, a Cartesian to polar converter $134_k$, and an amplifier $136_k$. Phase shifter $132_K$ includes a Direct Digital Synthesizer $138_k$ and a mixer $140_k$. Interpolator $116_k$ includes a cosine Look Up Table (LUT) $142_k$. Delay $130_k$ and DDS $138_k$ are coupled with inputs of mixer $140_k$. The output of mixer $140_k$ is coupled with the input of Cartesian to polar converter $134_k$. The phase output of Cartesian to polar converter $134_k$ is coupled with the input of interpolator 116K and the amplitude output of Cartesian to polar converter $134_k$ is coupled with the input of amplifier $136_k$. The output of interpolator $116_k$ and the output of amplifier $136_k$ are coupled with respective inputs of mixer $144_k$. It is noted that controller 105 also controls the settings of the effects (i.e., the duration of the delay, the level of the amplitude modulation, the amount of phase modulation and Doppler shift) introduced by each one of sub-band signal effect processors $114_1$, $114_2$, ..., $114_M$.

Delay $130_k$ receives a sub-band signal, introduces a respective delay to the sub-band signal. Delay $130_k$ may be implemented as a buffer memory in which the sub-band signal is stored for a period of time. Delay $130_k$ provides the delayed sub-band signal to phase shifter $132_k$. In phase shifter $132_k$, mixer $140_k$ mixes the delayed sub-band signal with a selected digitally synthesized signal to frequency and/or phase modulate the delayed sub-band signal. Frequency modulation also may be employed to introduce a Doppler shift to the sub-band signal. Phase shifter $132_k$ provides the frequency and/or phase modulated signal to Cartesian to polar converter $134_k$. Cartesian to polar converter $134_k$ converts the received complex values of the sub-band signal from Cartesian form (i.e., x+iy) to polar form (i.e., amplitude and phase values). Cartesian to polar converter $134_k$ provides phase values are provided to interpolator $116k$ and the amplitude values to amplifier $136_k$. Amplifier $136_k$ amplifies the amplitude of the sub-band signal (i.e., amplitude modulation) and provides the amplified amplitude values of the sub-signal to mixer $144_k$.

Interpolator $116_k$ increases the sampling frequency of the respective sub-band signal back to the sampling frequency of ADC 102. Recall that the sample rate of each sub-band signal is 'the overlap factor'/N of the sample rate of the sampled wideband IF signal. To that end, for each difference between pair of consecutive phase values, interpolator $116_k$ produces a sampled sinusoid including N/'the overlap factor' (i.e., N divided by the overlap factor) samples at a frequency corresponding to the difference between consecutive phase values. Interpolator $116_k$ employs cosine LUT $142_k$ to produce this sampled sinusoid. Interpolator $116_k$ provides the sampled sinusoid to Mixer $144_k$.

Mixer $144_k$ multiples the sinusoid samples by the amplitude values from amplifier $136_k$ to generate an affected sub-band re-transmit signal respective of sub-band k, referred to as the $k^{th}$ affected sub-band re-transmit signal. Mixer $144_k$ provides the $k^{th}$ affected sub-band re-transmit signal to a respective input of summer 112. Summer 112 sums the inputs therefore. Thus, summer 112 sums the affected sub-band re-transmit signals from the pertinent sub-band signal effect processors $114_1$, $114_2$, ..., $114_M$, and produces a wideband affected re-transmit signal.

As mentioned above, only selected ones of sub-band processors $110_1$, $110_2$, ..., $110_M$ process the respective sub-band signals provided thereto, and the number of samples per second being processed by each selected one of signal effect processor $110_1$, $110_2$, ..., $110_M$ (also referred to as the samples processing rate), is smaller by a factor of N/'the overlap factor', relative to the samples rate of sampled wideband IF signal 122 produced by ADC 102. As such, the processing requirements (i.e., power consumption and processing speed) of signal effect processor 106 are reduced relative to processing requirements for processing all the bandwidth of the received wideband IF signal. Also, since summer 112 produces a single signal, at the sample rate of the sampled wideband IF signal, there is no need to modify DAC 108, nor employ a DAC for each sub-band. In other words, a system according to the disclosed technique may replace existing DRFM system without modification to the operating rates of the ADC and DAC of the existing system.

System 100 may be implemented employing discrete components, on an Application Specific Integrated Circuit (ASIC), a Field Programmable Gate Array (FPGA), a Digital Signal Processor (DSP) or a general purpose computer. When implemented on a DSP or on a general purpose computer, system 100 includes a memory for storing machine-readable instructions configured to be executed by the DSP or by the general purpose computer.

Figure 2:
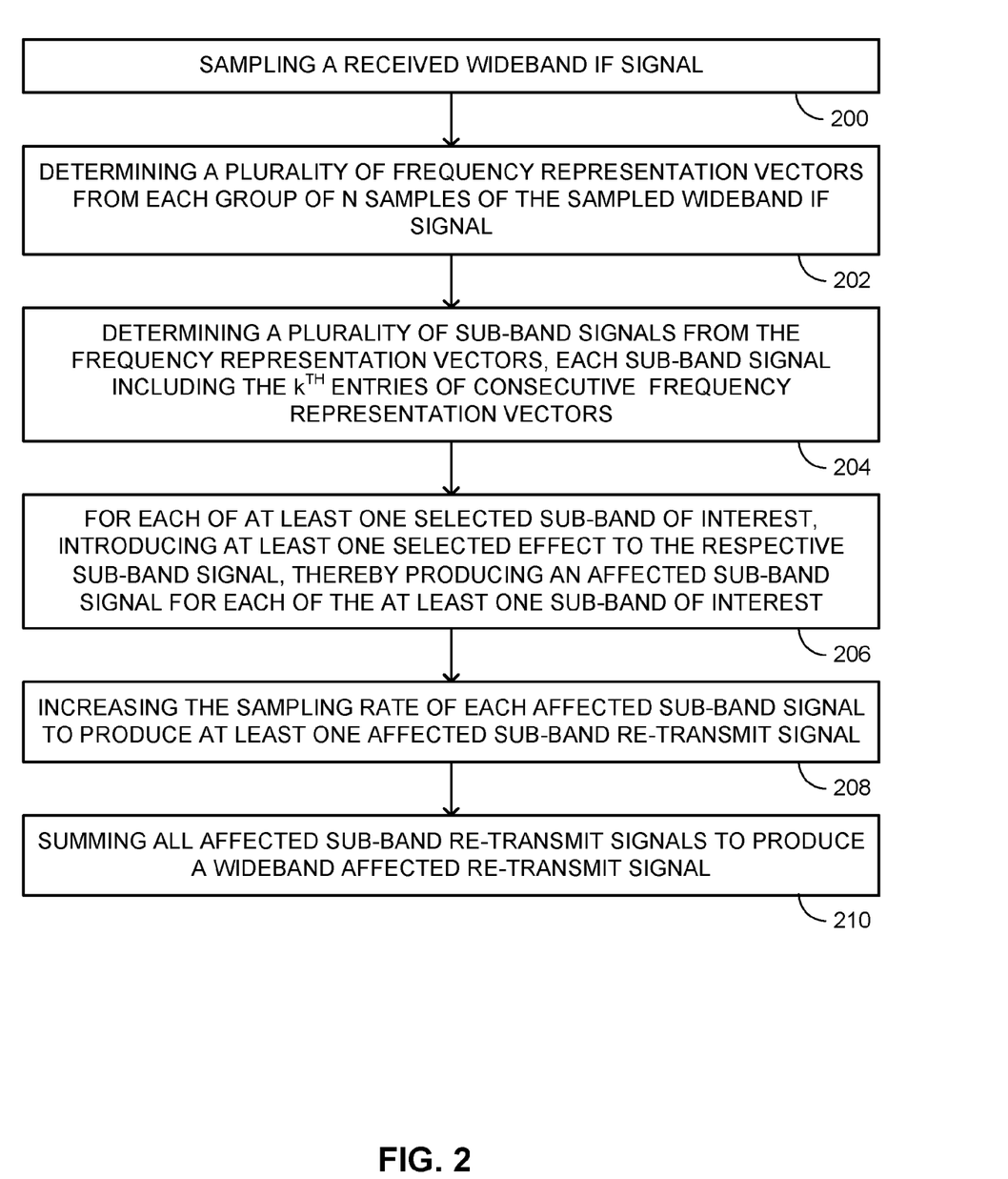
FIG. 2 is a schematic illustration of a method for signal re-transmission, operative in accordance with another embodiment of the disclosed technique.

Reference is now made to FIG. 2, which is a schematic illustration of a method for signal re-transmission, operative in accordance with another embodiment of the disclosed technique. In procedure 200, a received wideband IF signal is sampled at a respective sampling rate. With reference to FIG. 1A, ADC samples the wideband IF signal.

In procedure 202, a plurality of frequency representation vectors are determined from consecutive sample groups, each group including N samples of the sample wideband IF signal. These frequency representation vectors are determined, for example, by performing a Fourier Transform. Typically, the entries of these frequency representation vectors are complex numbers. With reference to FIGS. 1A and 1B, channelizer 104 determines a plurality of frequency representation vectors.

In procedure 204, a plurality of sub-band signals are determined from frequency representation vectors. Each sub-band signal is defined by a stream of the $k^{th}$ entries of consecutive frequency representation vectors. As such, each sub-band signal is associated with a respective $k^{th}$ sub-band of the bandwidth of the IF signal. Also, since each entry in a frequency representation vector is a complex number, the values of the sub-band signals are also complex numbers. Furthermore, the sample rate of each sub-band signal is 'the overlap factor'/N of the sample rate of the sampled wideband IF signal (i.e., since each of these entries is determined from a group of N samples). Thus, the sample rate of each sub-band signal is lower than the sample rate of the sampled wideband IF signal. With reference to FIGS. 1A and 1B, channelizer 104 determines sub-band signals from the $k^{th}$ entries, $X_1^k, X_2^k, X_3^k, \ldots, X_i^k, \ldots$, of each consecutive frequency representation vectors.

In procedure 206, for each of at least one selected sub-band of interest, at least one selected effect is introduced to the respective sub-band signal, thereby producing an affected sub-band signal for each of the at least one sub-band of interest. This effect or effects are, for example, at least one of delay, amplitude modulation, phase modulation, and Doppler effect, or any combination thereof. The effect or effects introduced to each sub-band signal need not be the same as the effect or effects introduced to other sub-band signals. For example, the effect introduced to one sub-band signal is only delay, while the effects introduce to another sub-band signal are delay and Doppler effect, and the effects introduce to yet another sub-band signal are delay, amplitude modulation and Doppler effect. With reference to FIG. 1A controller 105 selects the one or ones of signal effect processors $110_1$, $110_2$, ..., $110_M$ corresponding to the at least one selected sub-band of interest. The selected one or ones of signal effect processors $110_1$, $110_2$, ..., $110_M$ introduce respective effects introduced to the respective sub-band signals.

In procedure 208, the sample rate of each affected sub-band signal is increased to the sampling rate of the received wideband IF signal, to produce respective affected sub-band re-transmit signals. The sample rate is increased, for example, by producing, for each affected sub-band signal, N/'the overlap factor' samples of a sinusoid at a frequency corresponding to the phase difference between two consecutive samples of the corresponding affected sub-band signal. With reference to FIG. 1A, interpolator 112 increases the sampling rate of each sub-band signal.

In procedure 210, all (i.e., the one or more) affected sub-band re-transmit signals are summed to produce a wideband affected re-transmit signal. With reference to FIG. 1A, summer 112 sums the affected sub-band re-transmit signals from the pertinent sub-band signal effect processors $114_1$, $114_2$, ..., $114_M$, and produces a wideband affected re-transmit signal. It is noted that procedure 210 is performed only when more than one affected sub-band re-transmit signal is produced.

It will be appreciated by persons skilled in the art that the disclosed technique is not limited to what has been particularly shown and described hereinabove. Rather the scope of the disclosed technique is defined only by the claims, which follow.

The invention claimed is:

1. A system for signal re-transmission comprising:
a channelizer, configured to receive a sampled Intermediate Frequency signal, said sampled Intermediate Frequency signal exhibiting a first sampling rate, said channelizer further configured to produce a plurality of sub-band signals, each sub-band signal being associated with a respective sub-band of said sampled Intermediate Frequency signal, each sub-band signal exhibiting a second sampling rate lower than said first sampling rate;
a signal effect processor, coupled with said channelizer, said signal effect processor including a plurality of sub-band processors and a summer, each of at least one selected sub-band processor configured to receive a respective sub-band signal, to introduce at least one effect to said respective sub-band signal, and to increase the sampling rate of said respective sub-band signal to said first sampling rate, thereby producing a respective affected sub-band re-transmit signal, each of said at least one selected sub-band processor further configured to provide said respective affected sub-band re-transmit signal to a respective input of said summer, said summer configured to sum inputs thereof to produce a wideband affected re-transmit signal; and
a controller, coupled with said channelizer and with said signal effect processor, configured to select said at least one selected sub-band processor and to control settings of said at least one effect.

2. The system according to claim 1, wherein each said sub-band processors includes a sub-band signal effect processor and an interpolator,
wherein sub-band signal effect processor is configured to introduce said at least one respective effect to said respective sub-band signal, and
wherein said interpolator is configured to increase said sampling rate of said respective sub-band signal to said first sampling rate.

3. The system according to claim 2, wherein said effect is one of:
frequency modulation;
amplitude modulation;
phase modulation;
Doppler shift; and
delay.

4. The system according to claim 3, wherein said sub-band signal effect processor includes:
a delay configured to introduce a delay to said sub-band signal;
a phase shifter, coupled with said delay, configured to introduce phase shifts corresponding to at least one of said frequency modulation, phase modulation and Doppler shift;
a Cartesian to polar converter coupled with said phase shifter, configured to converts the received complex values of the sub-band signal from Cartesian form to polar form; and
an amplifier coupled with said Cartesian to polar converter, configured to amplify the amplitude of said sub-band signal.

5. The system according to claim 1, wherein said channelizer produces said plurality of sub-band signals by producing a plurality of frequency representations vectors, where each frequency representation vector includes a plurality of sub-bands, each frequency representation vector associated with a respective time-tag, and
wherein the $k_{th}$ entries of consecutive frequency representation vectors define a sub-band signal.

6. The system according to claim 1, wherein said channelizer produces said plurality of sub-band signals by employing one of:
Short Time Fast Fourier Transform;
Generalized Slide Fast Fourier Transform;
Sliding Discrete Fourier Transform; and
a bank of time filters with decimation.

7. A method for signal re-transmission comprising the procedures of:
determining a plurality of sub-band signals, each sub-band signal being associated with a respective sub-band of sampled received Intermediate Frequency signal, said sampled received Intermediate Frequency signal exhibiting a first sampling rate, each sub-band signal exhibiting a second sampling rate lower than said first sampling rate;
for each of at least one selected sub-band of interest, introducing at least one selected effect to the respective sub-band signal, thereby producing an affected sub-band signal for each of said at least one sub-band of interest;

increasing the sample rate of each affected sub-band signal to said first sampling rate to produce at least one effected sub-band re-transmit signal; and summing all affected sub-band re-transmit signals to produce a wideband affected re-transmit signal.

8. The method according to claim 7, wherein said effect is one of:
frequency modulation;
amplitude modulation;
phase modulation;
Doppler shift; and
delay.

9. The method according to claim 7, wherein prior to said procedure of determining a plurality of sub-band signals, said method includes the procedure of determining a plurality of frequency representation vectors from each group of samples of said received sampled wideband Intermediate Frequency signal,
wherein the $k_{th}$ entries of consecutive frequency representation vectors define a sub-band signal.

10. The method according to claim 9, wherein prior to said procedure of determining a plurality of frequency representation vectors, said method includes the procedure of sampling said received Intermediate Frequency signal at said first sampling rate.

11. The method according to claim 7, wherein said plurality of sub-band signals are determined by employing one of:
Short Time Fast Fourier Transform;
Generalized Slide Fast Fourier Transform;
Sliding Discrete Fourier Transform; and
a bank of time filters with decimation.

\* \* \* \* \*